United States Patent
Tanaka et al.

[11] Patent Number: 5,563,964
[45] Date of Patent: Oct. 8, 1996

[54] METHOD AND APPARATUS FOR PROCESSING A PLURALITY OF DESIGNATED AREAS OF AN IMAGE

[75] Inventors: Tetsuomi Tanaka, Yokohama; Masayuki Kiriyama, Tokyo, both of Japan

[73] Assignee: Canon Kabushiki Kaisha, Tokyo, Japan

[21] Appl. No.: 387,616

[22] Filed: Feb. 13, 1995

Related U.S. Application Data

[63] Continuation of Ser. No. 26,109, Mar. 1, 1993, abandoned, which is a continuation of Ser. No. 699,272, May 14, 1991, abandoned.

[30] Foreign Application Priority Data

May 15, 1990 [JP] Japan ..................... 2-125934
Apr. 12, 1991 [JP] Japan ..................... 3-079928

[51] Int. Cl.$^6$ ..................................... G06K 9/36
[52] U.S. Cl. ........................... 382/292; 382/305
[58] Field of Search .................... 382/173, 291, 382/292, 305, 306, 317; 358/453, 538

[56] References Cited

U.S. PATENT DOCUMENTS

| | | | |
|---|---|---|---|
| 4,566,126 | 1/1986 | Miyagawa et al. | 382/48 |
| 4,581,762 | 4/1986 | Lapidus et al. | 382/22 |
| 4,761,818 | 8/1988 | Bannai | 382/41 |
| 4,852,183 | 7/1989 | Abe et al. | 382/34 |
| 4,903,311 | 2/1990 | Nakamura | 382/9 |
| 4,963,996 | 10/1990 | Bannai | 358/453 |
| 5,091,969 | 2/1992 | Kuwashima | 382/48 |
| 5,093,873 | 3/1992 | Takahashi | 382/61 |
| 5,123,062 | 6/1992 | Sangu | 382/57 |
| 5,138,668 | 8/1992 | Abe | 382/9 |
| 5,159,187 | 10/1992 | Okisu et al. | 250/208.1 |
| 5,369,716 | 11/1994 | Sangu | 382/61 |

FOREIGN PATENT DOCUMENTS

| | | | |
|---|---|---|---|
| 61-253587 | 11/1986 | Japan | G06K 9/20 |
| 63-109591 | 5/1988 | Japan | G06K 9/20 |

OTHER PUBLICATIONS

"An Integrated Man–Machine System For Reading Printed Text", R. N. Ascher, Proc. of the National Electronics Conference, Dec. 7, 1970, vol. XXVI, pp. 486–488.

*Primary Examiner*—Leo Boudreau
*Assistant Examiner*—Andrew W. Johns
*Attorney, Agent, or Firm*—Fitzpatrick, Cella, Harper & Scinto

[57] ABSTRACT

An image processing method and apparatus for processing a designated area of an image includes storing image data, designating one or more rectangular areas in the image data, and storing data representative of the position of the designated rectangular areas. Once completion of designating of rectangular areas is detected, recognition of image data in the designated rectangular areas is commenced.

40 Claims, 10 Drawing Sheets

METHOD AND APPARATUS FOR PROCESSING A PLURALITY OF DESIGNATED AREAS OF AN IMAGE

This application is a continuation of application Ser. No. 08/026,109 filed Mar. 1, 1993, now abandoned, which was a continuation of application Ser. No. 07/699,272 filed May 14, 1991, now abandoned.

BACKGROUND OF THE INVENTION

1. Field of the Invention

The invention relates to image processing method and apparatus and, more particularly, to image processing method and apparatus which can improve an operating performance for designation of an area to be processed.

2. Related Background Art

Hitherto, there has been known a method whereby in image information displayed, an area to be processed is designated as a rectangle and when one area is designated, a process is immediately started.

However, in the above conventional method, since only one area can be designated once as a rectangular area in which the user executes a recognizing process, when portions which the user needs are picked up from a document image and are used to form a text, designating and recognizing processes of rectangular areas must be executed a plurality of times or it is necessary to designate surplus areas and to delete unnecessary portions after completion of the recognizing process. Thus, there is a drawback such that a large burden is exerted on the user.

Explanation will now be made with reference to, for instance, FIG. 4. When the user wants to form a text from "G" to "W" and a text from "k" to "w", three operations are executed to perform the recognizing process by designating a rectangle (1), the recognizing process by designating a rectangle (2), and the recognizing process by designating a rectangle (3).

Since the areas to be processed are alternately designated and processed as mentioned above, the user must execute only such works until all of desired areas are designated, so that it is very troublesome.

SUMMARY OF THE INVENTION

To solve the above conventional problems, it is an object of the invention to provide image processing method and apparatus in which a plurality of rectangular areas to be processed can be designated and by starting processes after all of desired areas were designated, an operating performance for area designation is improved and a high processing efficiency is obtained.

DESCRIPTION OF THE PREFERRED EMBODIMENTS

Figure 1:
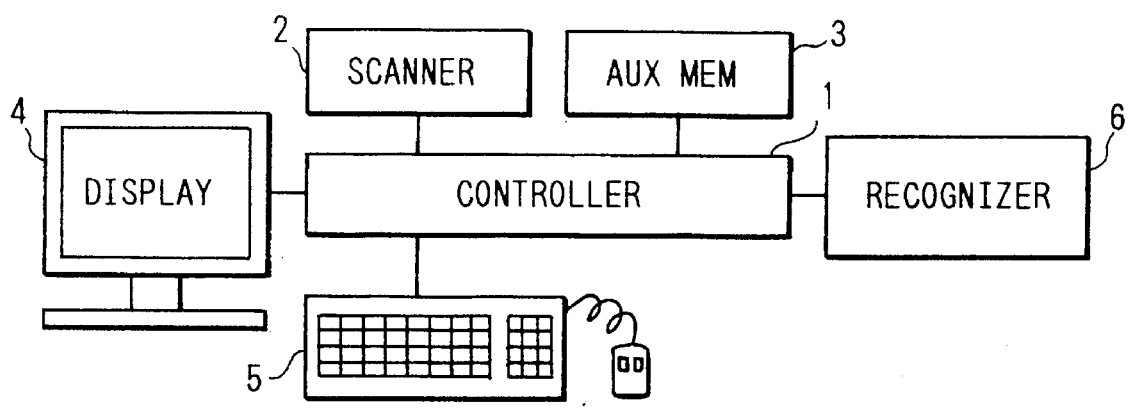
FIG. 1 is a schematic constructional diagram of the first embodiment of the invention.

FIG. 1 shows a schematic constructional diagram of an embodiment of the invention. The embodiment will be described. In FIG. 1, reference numeral 1 denotes a controller including a CPU, an ROM and an RAM in which programs shown in a flowchart, which will be explained hereinlater, and the like have been stored, and the like. The controller 1 executes a document editing work. Reference numeral 2 denotes a scanner to read an image from a document; 3 an auxiliary memory to store the document image, texts, and the like; 4 a display to display an image or the like; 5 an input device such as keyboard, mouse, etc. to give an instruction to the controller 1 by the user; and 6 a recognizer to convert a document image into a document code. All of the components 2 to 6 are connected to the controller 1.

Figure 2:
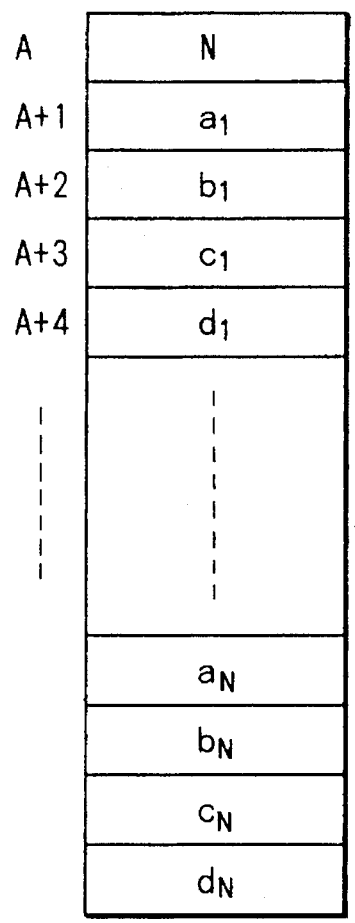
FIG. 2 is a diagram showing an example of a memory format in a controller 1 in FIG. 1.

FIG. 2 is a diagram showing an example of a part of a memory format provided in the controller 1. It is now assumed that the number N of rectangles is stored into an address A and that coordinates (a, b) and (c, d) of two points on a diagonal line to express the position of each rectangle on a 4-word unit basis are sequentially stored from an address (A+1) until N rectangles.

Figure 5:
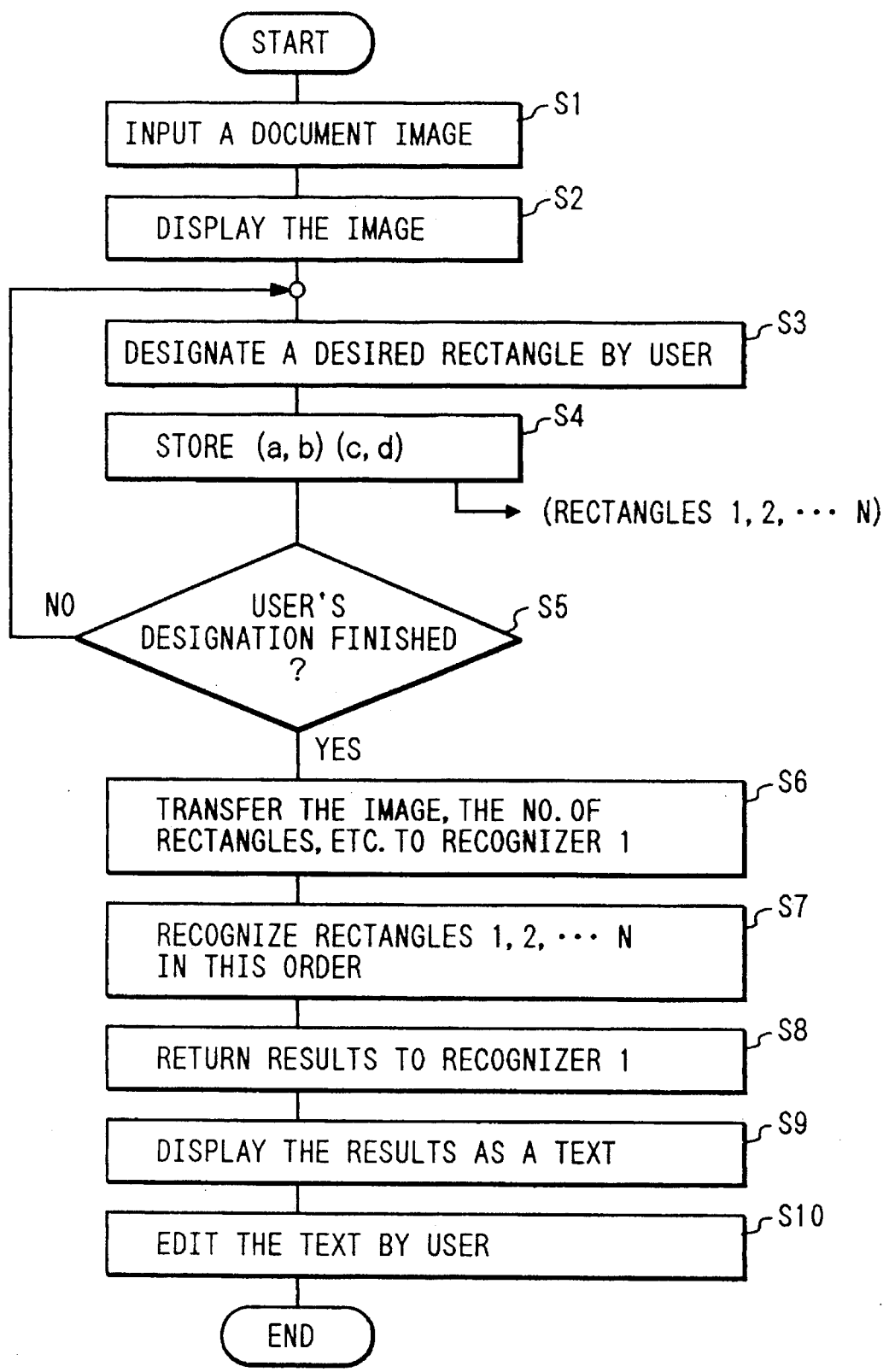
FIG. 5 is a flowchart showing processes of the first embodiment.

FIG. 5 is a flowchart for explaining the processes of the embodiment of the invention.

In the first step S1, a document image to be processed is sent to the controller 1 from the scanner 2 or auxiliary memory 3 and is stored into the memory in the controller 1. In step S2, the stored document image is displayed on the display 4 for the user. The number N of rectangles stored in the memory is initialized to 0 and the apparatus waits for a next input from the user. In step S3, if a command to designate a desired processing rectangle has been given from the user by the input device 5, the number N of rectangles in the memory is sequentially increased by "1" and the coordinates (a, b) and (c, d) of two points of the designated rectangle are stored (step S4). After completion of the designation of the portion which the user needs (step S5), it is informed to the controller 1 by the input device 5 and the controller 1 sends the document image data, the number of rectangles, the rectangle position information, and order information to the recognizer 6 (step S6). In step S7, the recognizer 6 executes a character cutting-out process, a feature extracting process, and a discriminating process with respect to the image area of $(a_N, b_N)$–$(c_N, d_N)$ in FIG. 2 and stores candidata character codes into a memory in the recognizer 6. In step S8, a candidate character code train as results of the recognition are returned to the controller 1 as a host computer in accordance with the order of the areas 1 to N. In step S9, the controller 1 displays the recognition results (candidate characters) as a text.

In step S10, an editing process such as a correction or the like is executed by the user. The controller can be also provided in the recognizer 6. The processes shown in FIG. 5 are performed in cooperation with the controller 1.

In the construction shown in FIG. 1, it is also possible to construct in a manner such that when an image is transferred from the controller 1 to the recognizer 6, the controller 1 cuts out rectangular areas and transmits in accordance with the designated order, and the recognizer 6 cuts out characters in each rectangular area and executes the recognizing processes and returns the recognition results to the controller 1.

Thus, a transfer size can be reduced.

In the construction shown in FIG. 1, it is also possible to construct in a manner such that the controller 1 cuts out characters from each rectangular area in accordance with the order and sends the cut-out character image and the number of images to the recognizer 6 and that the recognizer 6 recognizes each character image and sends the recognition results to the controller 1.

Figure 3:
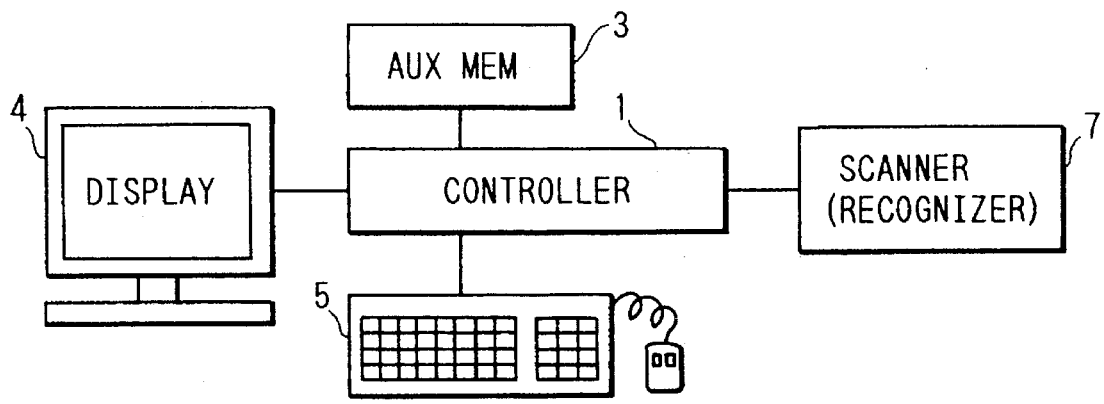
FIG. 3 is a diagram showing a construction of an image processing apparatus in which a scanner includes a recognizer.

Processes to embody the invention by an image processing apparatus in the case where the recognizer is included in the scanner will now be described with reference to a constructional diagram of FIG. 3. In FIG. 3, reference numeral 1 denotes the controller to execute a document editing work; 3 the auxiliary memory to store document images and texts; 4 the display to display the document image or the like to the user; 5 the input device such as keyboard, mouse, etc. for giving a command from the user to the controller 1; and 7 a scanner including recognizing means.

First, a document image to be processed is sent from the scanner 7 to the controller 1 and stored into the memory in the controller 1. At this time, the document image is also stored into the recognizer in the scanner 7. In a manner similar to the embodiment 1, after that, information of only the positions, number, and order to the rectangles is transferred from the controller 1 to the scanner recognizing apparatus 7 and the document image is not transferred again, so that the processing time is reduced by only the time for the image transfer.

In the above description, a shape of area which is designated has been set to a rectangle. However, the invention is not limited to the rectangle but it can be set to an arbitrary shape such as triangle, circle, free shape, and the like.

In the above description, although the recognizing processes have been performed in accordance with the order of the designated areas, they can be also executed in accordance with the order of the coordinate positions or the paragraphs of the document.

A data format and the like in the above embodiment will now be described further in detail.

Figure 6:
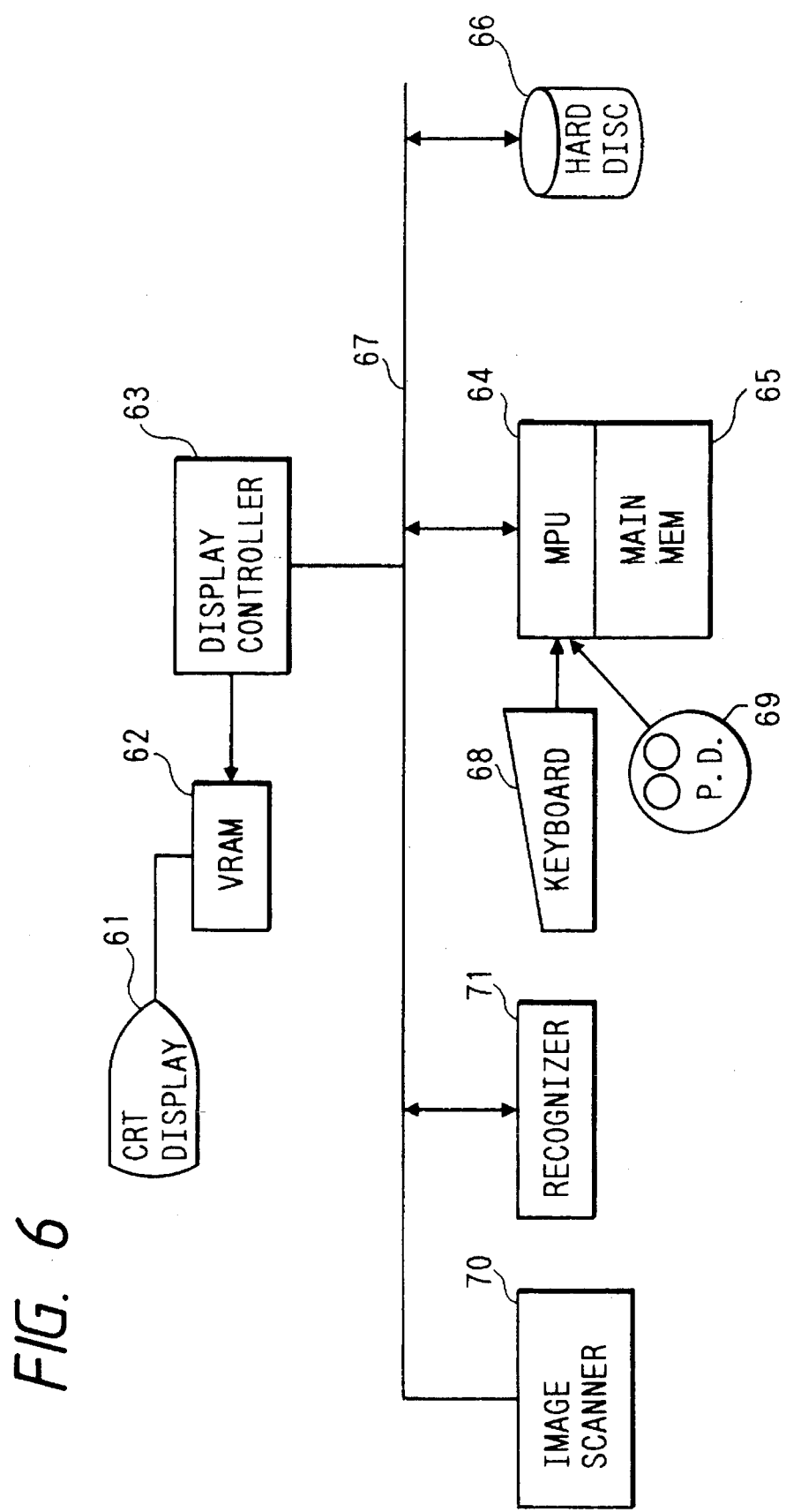
FIG. 6 is a block diagram for explaining further detailed processes of an image processing apparatus for embodying the invention.

FIG. 6 is a block diagram showing a construction of an image processing apparatus for explaining further in detail.

Figure 12:
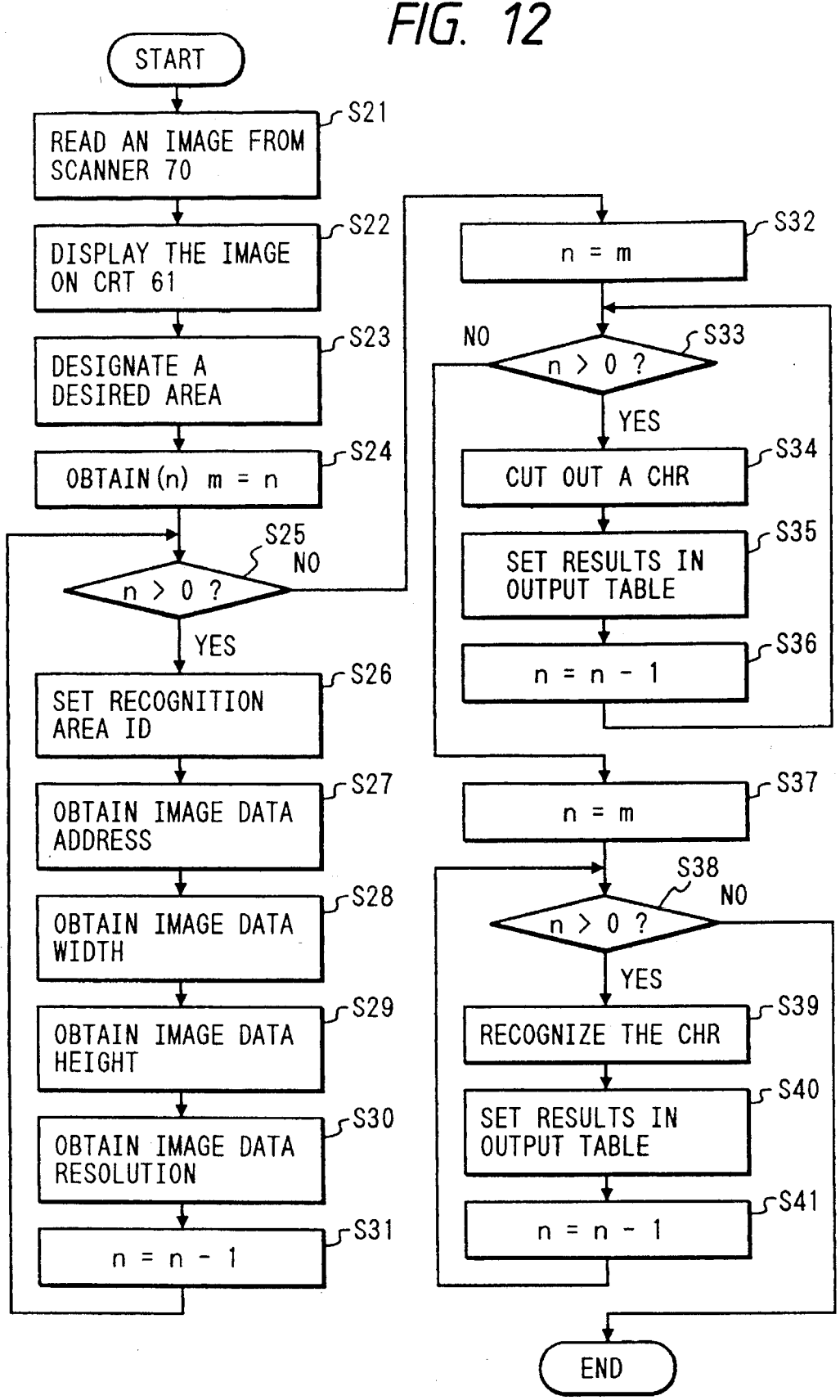
FIG. 12 is a flowchart showing processes of the embodiment.
Figure 14:
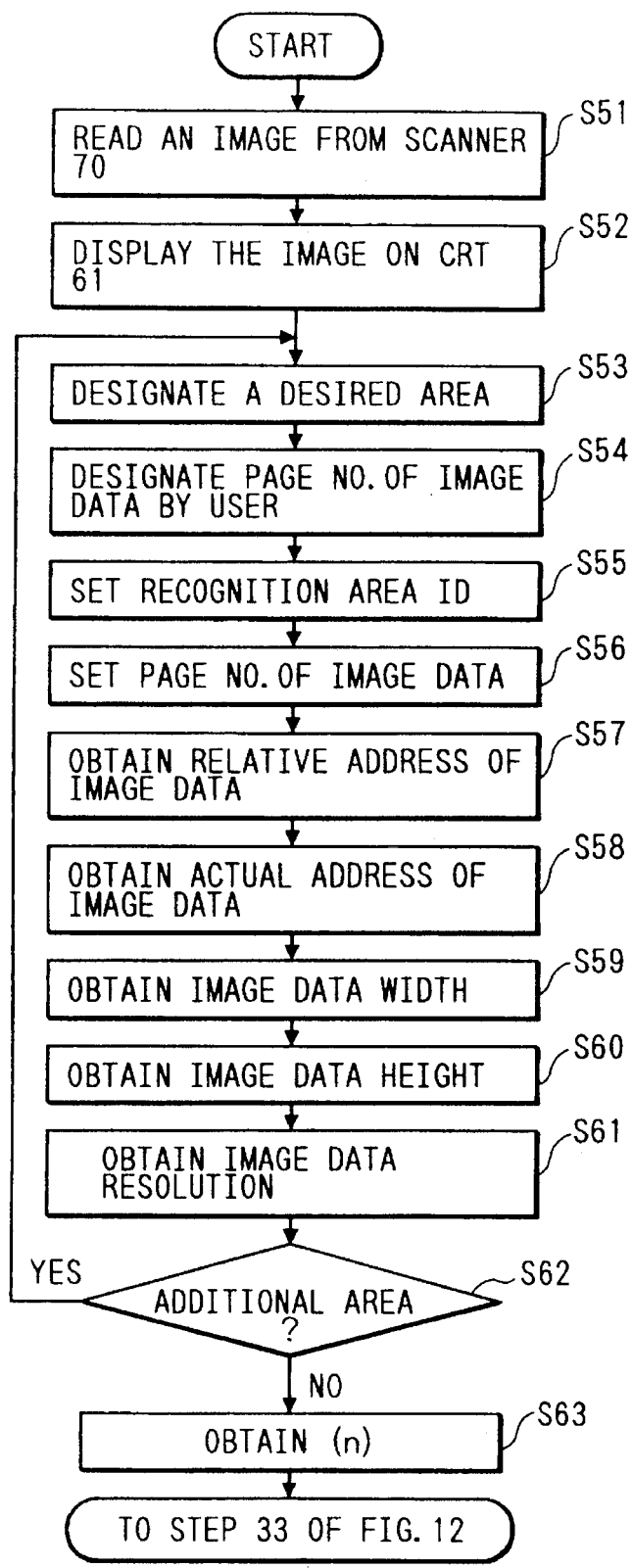
FIG. 14 is a flowchart showing processes in the case where there are a plurality of pages having image information as an object to be processed.

In FIG. 6, reference numeral 61 denotes a display which will be explained with respect to an example of a CRT which is used in the raster scan display system in the embodiment. Reference numeral 62 denotes a video RAM (VRAM) to store display pattern information of one picture plane which is displayed by the display 61; 63 a display controller to control the writing operation of a pattern edition into the VRAM 62 and the reading operation to the CRT display 61; and 65 a main memory having areas to store control program of processes as shown in FIGS. 12 and 14 and text data. The main memory 65 has an ROM (read only memory) and an RAM (random access memory). Reference numeral 64 denotes a microprocessor (MPU) to perform a main control of the apparatus in accordance with the control program in the main memory 65.

A keyboard 68 to input character data, control codes, and the like and a pointing device (PD) 69 for designating a position on the CRT display 61 and for executing an input edition of figure data are connected to the MPU 64. Reference numeral 66 denotes a hard disc in which text files and character fonts are stored; 70 indicates an image scanner to read image data such as a character image or the like; and 71 a recognizer to convert a character image into a character code. The above constructing blocks are connected by an I/O bus 67.

Figure 4:
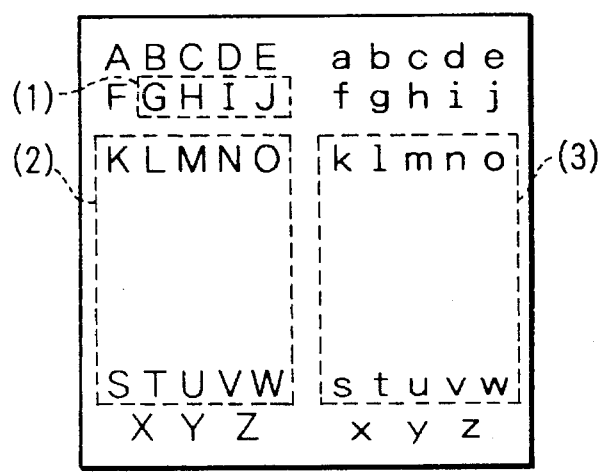
FIG. 4 is a diagram for explaining a method of designating areas to be processed in image information as an object for recognition.

FIG. 4 is a diagram showing an example of an original such that character recognizing areas must be designated a plurality of times. Such an original image is displayed on the display 61.

In FIG. 4, reference numerals (1), (2), and (3) indicate areas, namely, recognition areas in which character information which has been given as image data is converted into character codes. In the case where a plurality of character recognizing object areas exist in the original which is input as shown in FIG. 4, ranges of the recognition areas are continuously designated by using the pointing device 9 or the like. After completion of the designation of the recognizing areas, the character recognition is subsequently executed.

Figure 7:
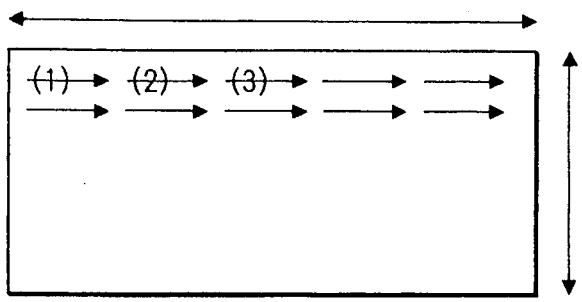
FIG. 7 is a first schematic diagram in the case of inputting image data as an object to be processed.
Figure 8:
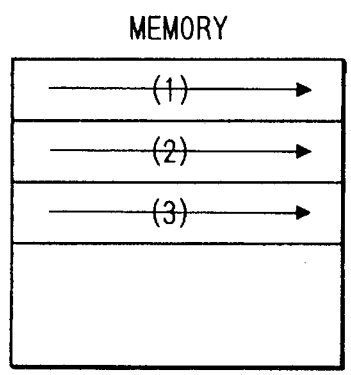
FIG. 8 is a second schematic diagram in the case of inputting image data as an object to be processed.
Figure 9:
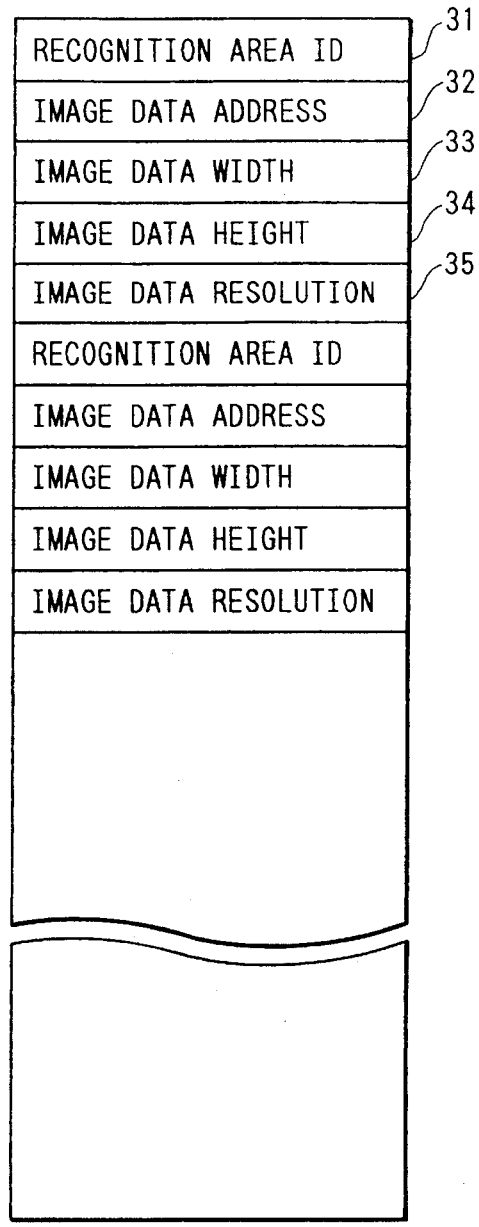
FIG. 9 is a diagram showing an example of a data format to store area information.

FIGS. 7 to 9 are schematic diagrams showing binary image data which is stored into the main memory 65 of the areas designated on the input original. FIG. 7 shows the image data as an object of the recognizing process. In this case, one pixel corresponds to one bit, a black pixel corresponds to "1" data, and a white pixel corresponds to "0" data. The pixels are stored into the main memory 65 by a format as shown in FIG. 8.

FIG. 9 is a diagram showing an example of a format of the binary image data of a recognition object image which is transmitted to a character cutting-out processing program. The binary image data of only the number as many as the number of recognition areas are stored into the main memory 65. In the diagram, reference numeral 31 denotes a recognition area ID and numbers are merely added to a plurality of recognition areas. The numbers of 1, 2, 3, ... are added in this case from the first area among a plurality of areas in the input image in accordance with this order. Information indicative of an image data address 32, a lateral width 33 of the image data, a height 34 of the image data, and a resolution 35 of the image data in the recognition area is stored every area. The information is used in the character cut-out processing program for cutting out areas including characters from the image information which is executed by the MPU 64.

Figure 10:
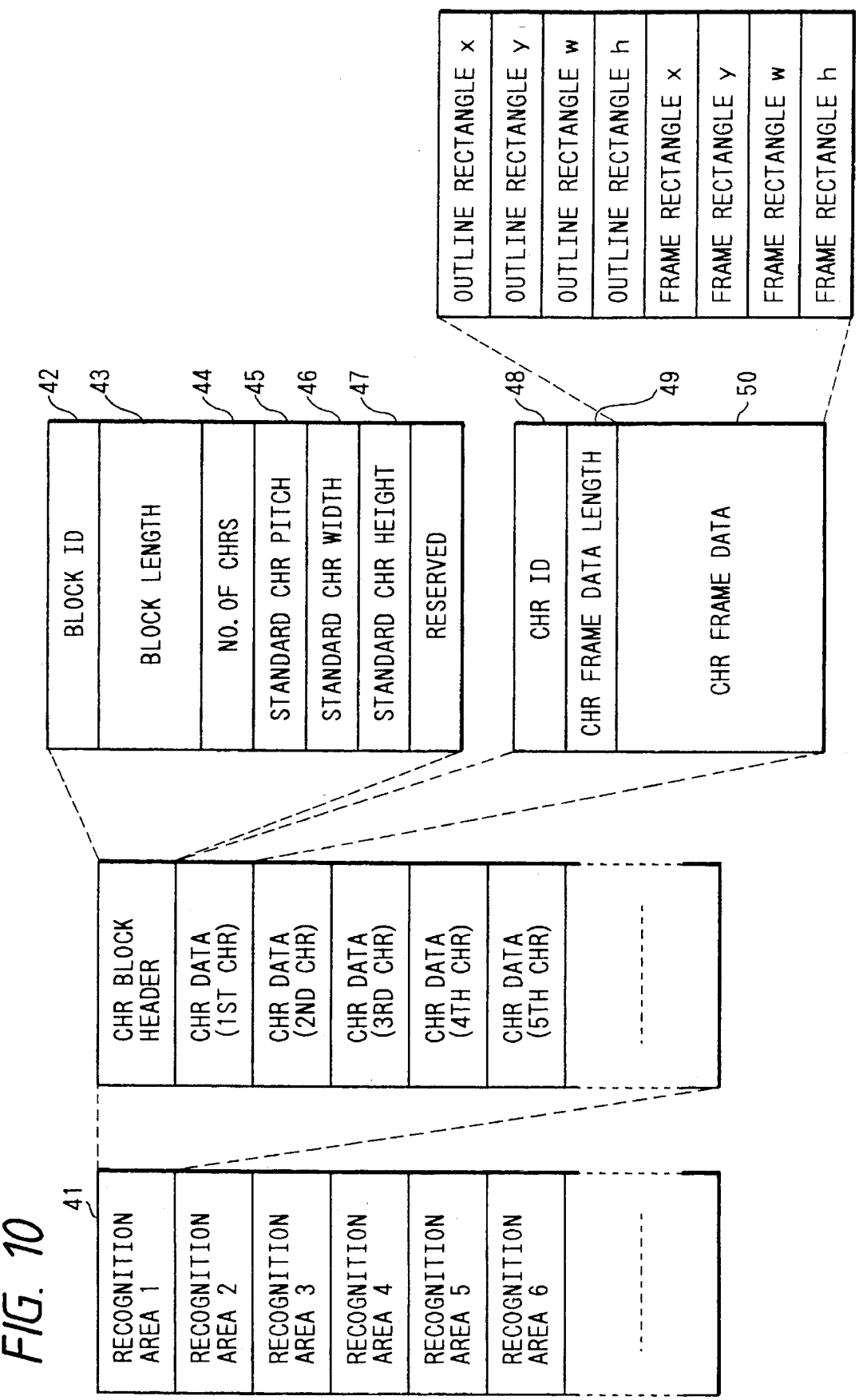
FIG. 10 is a diagram showing the first example of a data format to store character cut-out results.

FIG. 10 is a diagram showing an example of a data format of results of the character cutting-out process.

The data indicative of the results of the character cutting-out process comprises addresses 41 to the information of the recognition areas which exist by the number of designated areas. Each of the recognition areas 41 has information indicative of the header of the block in which the character cutting-out process has been executed and data of each character.

Further, the character block header information has the following data every block as a unit of the data when the image data is sent from the host computer to the recognizer: a character frame block ID number in which the numbers 1, 2, 3, . . . have been added in accordance with the sending order; a block length excluding the block header; the number of characters included in the block; a standard character pitch of the character train included in the block; a standard character width 46 of the character train included in the block; and a standard character height of the characters included in the block.

The data of every character includes: a character ID 48 in which the numbers have been added to the characters in the block in accordance with the appearing order; a character frame data length 49; and character frame data 50 to store outline rectangles x, y, w, and h and frame rectangles x, y, w, and y (data each of which indicates the coordinates of the left upper edge of the rectangle and the width and height of the rectangle).

Figure 11:
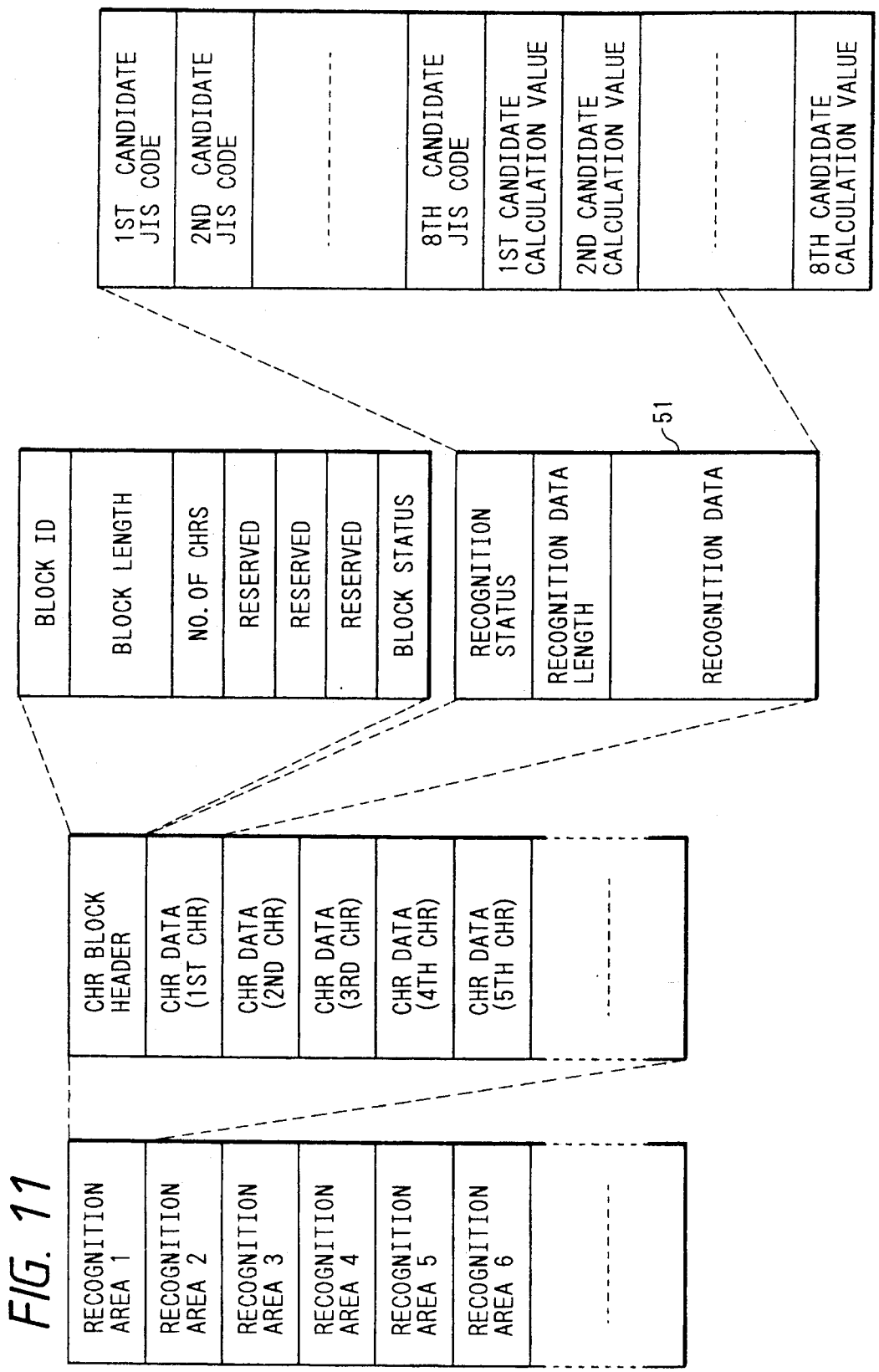
FIG. 11 is a diagram showing the second example of a data format to store character cut-out results.

FIG. 11 is a diagram for explaining a data format showing the results of the recognizing process. The data format is stored into the main memory 65. The recognizing process is executed on a block unit basis. Actually, the character frame blocks shown in FIG. 10 are sent to the recognizer 71 and are converted into the character codes and are again transferred. In the diagram, reference numeral 51 denotes recognition data. Eight candidate characters are generated per character. As shown in FIG. 11, the recognition results are sequentially set into a stable by only the number of recognition areas.

FIG. 12 is a flowchart for a processing procedure according to an embodiment of the invention. The processes in the above procedure are performed under the control of the MPU 64 and all of discriminating processes are also executed by the MPU 64. The processes will now be described hereinbelow every processing step.

First, character image data is read from the image scanner 70 (step S21). The read character image data is displayed on the CRT display 61 (step S22). A range of a desired area to be character recognized is designated by using the pointing device 69 or the like (step S23). The number (n) of recognition areas is obtained (step S24). A check is made to see if the value of n is larger than 0 or not (step S25). If YES, the recognition area ID is set (step S26). The address of the recognition area as an object is obtained (step S27). The lateral width of the image data of the recognition area as an object is obtained (step S28). The height of the image data of the recognition area is obtained (step S29). The resolution of the image data is obtained (step S30). The value of n is decreased by "1" in step S30. After that, the processing routine is returned to step S25 and the information of the next recognition area is obtained (step S31). On the other hand, if NO in step S25, the number (n) of recognition areas which has been obtained in step S24 is reset to the initial value (m) (step S32). A check is made to see if a recognition area still exists or not (n>0?) or not (step S33). If YES, the character cutting-out process of the recognition area is executed (step S34). The results of the character cutting-out process are set into an output table (step S35). Subsequently, the value of n is decreased by "1" in step S36. After that, the processing routine is returned to step S33 and the next character cutting-out process is executed (step S36). On the other hand, if NO in step S33, the number (n) of recognition areas which has been obtained in step S24 is reset to the initial number (m) (step S37). A check is made to see if a recognition area still exists (n>0?) or not (step S38). If YES, the character recognition is executed by the recognizer 71 (step S39). The results of the character recognizing process is set into an output table (step S40). The value of n is decreased by "1" (step S41). After that, the processing routine is returned to step S38. On the other hand, if NO in step S38, that is, if there is no more recognition area, the processing routine is finished.

The embodiment has been described above with respect to the case of one input original. A character recognizing process when a plurality of pages of an input original exist will now be described hereinbelow.

Figure 13:
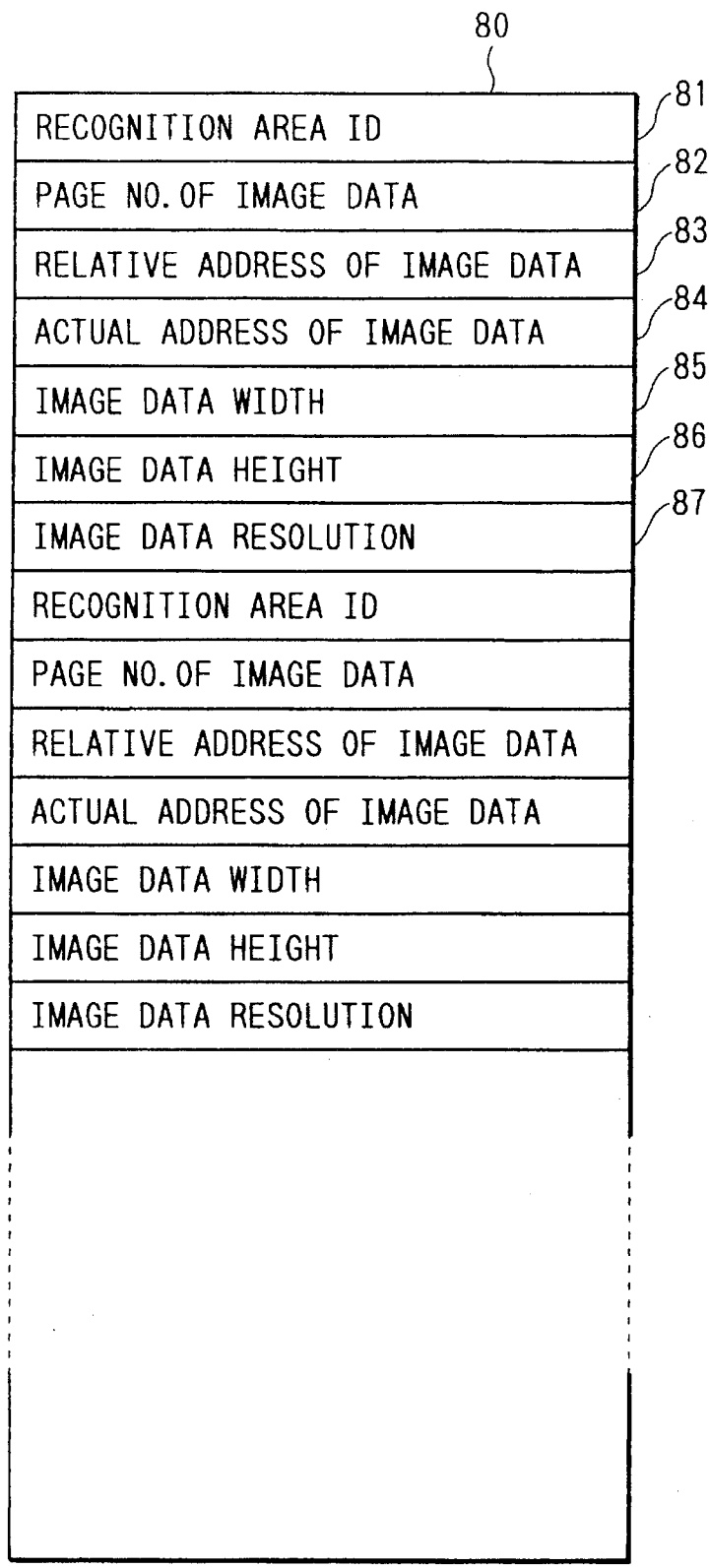
FIG. 13 is a diagram showing an example of a data format to store area information in the case where there are a plurality of pages having image information as an object to be processed.

FIG. 13 shows a structure of binary image data 80 which is used in the character cut-out processing program. The binary image data is stored into the main memory 65 by only the number of recognition areas.

The image data 80 includes: a recognition area ID 81 in which the numbers 1, 2, 3, . . . have been added from the first area as the recognition area numbers; a page number 82 of the character image data indicating that the recognition area whose range has been designated relates to the character image data of which number of page; a relative address 83 of the recognition area image data indicative of the relative value from the left upper coordinates of the character image data of one page; a real address 84 of the recognition area image data; a lateral width 85 of the recognition area image data; a height 86 of the recognition area image data; and a resolution 87 of the recognition area image data.

A procedure of the character recognizing process with respect to a plurality of pages will now be explained by a flowchart of FIG. 14. All of the controls and discriminations of the above processes are executed by the MPU 64.

First, character image data is read from the image scanner 70 (step S51). The read character image data is displayed by the CRT display 61 (step S52). A range of an area to be character recognized is designated by the pointing device 69 or the like (step S53). The operator designates that the recognition area whose range has been designated relates to the area of which number of page of a plurality of image data (step S54). The recognition area ID is set (step S55). The operator sets the designated page number (step S56). The relative address of the image data of the recognition area is obtained (step S57). The relative address is expressed by the relative position from the left upper coordinates of the whole character image data. The real address of the recognition area image data is obtained (step S58). The real address is obtained from the left upper coordinates of the whole character image data and the relative address derived in step S57. The lateral width of the image data of the recognition area is obtained (step S59). The height of the image data of the recognition area is obtained (step S60). The resolution of the image data is further obtained (step S61). The operator further instructs whether an area to be character recognized should be designated or not (step S62). If there is an area to be character recognized, the processing routine is returned to step S53. If NO, step S63 follows and the number (n) of designated areas is obtained.

Subsequent processes, that is, the character cutting-out processes are similar to the processes in step S33 and subsequent steps in FIG. 12.

In the character recognizing process of the input original in which a plurality of pages exist according to the above embodiment, it is not always necessary to read the entire input original in a lump and to display a plurality of pages on the CRT screen.

The operator first reads the input original of the first page from the scanner and designates a range of the recognition area in the character image data of the first page. That is, the area designation of the second and subsequent pages can be also executed in the character image data of the first page. Actually, the positions of the recognition areas of the second and subsequent pages are presumed and the area designation is performed in the character image data of the first page. The relative address of the recognition area has been first obtained in the first page and when the character image data of the second and subsequent pages is read from the scanner, the real address of the recognition area is obtained.

Therefore, there is no need to perform the range designation of the recognition area for a plurality of pages.

As will be obviously understood from the above description, by storing the information of a plurality of image data whose areas have continuously been designated in a lump, the character recognizing processes can be executed in a lump. Thus, there is an advantage such that the processing time which is required for the whole character recognition can be reduced.

What is claimed is:

1. An image processing method comprising the steps of:
   inputting image data;
   designating a plurality of rectangular areas in the input image data;
   storing data representative of coordinates of the plurality of designated rectangular areas together with respective area identification labels designating order information indicating a sequential order in which the plurality of rectangular areas have been designated in said designating step;
   detecting completion of the designating step;
   obtaining image data of a plurality of areas specified by the stored coordinate data from the input image data, the stored coordinate data being read on the basis of the order information; and
   initiating recognition of the obtained image data after completion of the designating step has been detected.

2. A method according to claim 1, wherein a plurality of areas to be stored exist.

3. A method according to claim 1, wherein the image data is recognized after a signal indicative of the completion of the area designation has been input.

4. A method according to claim 1, wherein said storing step further comprises storing page information for each respective area.

5. A method according to claim 1, wherein said designating step designates a plurality of areas of arbitrary shape.

6. A method according to claim 1, wherein said designating step designates the plurality of rectangular areas on a display screen which displays the image data.

7. A method according to claim 6, wherein said designating step designates the plurality of rectangular areas with a mouse.

8. A method according to claim 1, wherein said inputting step inputs the image data with a scanner.

9. A method according to claim 1, further comprising the step of displaying the input image data on a display.

10. A method according to claim 9, further comprising the step of displaying a recognition result on the display.

11. An image processing apparatus comprising:
    image data memory means for inputting image data;
    area designating means for designating a plurality of rectangular areas in the input image data;
    area memory means for storing data representative of coordinates of the plurality of designated rectangular areas together with respective area identification labels designating order information indicating a sequential order in which the plurality of rectangular areas have been designated in said designating means;
    detecting means for detecting that said area designating means has completed designating rectangular areas in the stored image data;
    obtaining means for obtaining image data of a plurality of areas specified by the stored coordinate data from the input image data, the stored coordinate data being read on the basis of the order information; and
    starting means for starting recognition of the obtained image data after said detection means detects that said area designating means has completed designating rectangular areas.

12. An apparatus according to claim 11, wherein a plurality of area data to be stored into said area memory means exist.

13. An apparatus according to claim 11, wherein said starting means starts the recognition after a signal indicative of the completion of the area designation by the area designating means has been input.

14. An apparatus according to claim 11, wherein said area memory means further comprises means for storing page information together with the data and area identification label for each area.

15. An apparatus according to claim 11, wherein said area designating means designates a plurality of areas of arbitrary shape.

16. An apparatus according to claim 11, wherein said area designating means designates the plurality of rectangular areas on a display screen which displays the image data.

17. An apparatus according to claim 16, wherein said area designating means designates the plurality of rectangular areas with a mouse.

18. An apparatus according to claim 11, wherein said image data memory means inputs the image data with a scanner.

19. An apparatus according to claim 11, further comprising a display for displaying the input image data.

20. An apparatus according to claim 19, wherein said display also displays a recognition result.

21. A method for recognizing images, the method comprising the steps of:
    storing image data;
    designating a plurality of rectangular areas in the stored image data;
    storing data representing a plurality of rectangular areas of the stored image data in a sequential order in which the areas have been designated, wherein the data for the areas include respective area identification labels designating the sequential order in which the areas have been designated;
    obtaining image data of a plurality of areas specified from the stored image data;
    initiating recognition of the obtained image data; and
    outputting a recognition result of the image data in the sequential order.

22. A method according to claim 21, wherein a plurality of areas to be stored exist.

23. A method according to claim 21, wherein the image data is recognized after a signal indicative of the completion of the area designation has been input.

24. A method according to claim 21, wherein said step of storing data for areas further comprises storing page information for each respective area.

25. A method according to claim 21, wherein said designating step designates a plurality of areas of arbitrary shape.

26. A method according to claim 21, wherein said designating step designates the plurality of rectangular areas on a display screen which displays the image data.

27. A method according to claim 26, wherein said designating step designates the plurality of rectangular areas with a mouse.

28. A method according to claim 21, wherein said storing step stores image data input with a scanner.

29. A method according to claim 21, wherein said outputting step outputs the recognition result on a display.

30. A method according to claim 21, further comprising the step of displaying the stored image data.

31. An apparatus for recognizing images, comprising:

first storage means for storing image data;

designating means for designating a plurality of rectangular areas in the stored image data;

second storage means for storing data representing a plurality of rectangular areas of the stored image data in a sequential order in which the areas have been designated, wherein the data for the areas include respective area identification labels designating the sequential order in which the areas have been designated;

obtaining means for obtaining image data of a plurality of areas specified from the stored image data;

initiating means for initiating recognition of the obtained image data; and output means for outputting a recognition result of the image data in the sequential order.

32. An apparatus according to claim 31, wherein a plurality of area data to be stored into said second storage means exist.

33. An apparatus according to claim 31, wherein said initiating means initiates the recognition after a signal indicative of the completion of the area designating by the area designating means has been input.

34. An apparatus according to claim 31, wherein said second storage means further comprises means for storing page information together with the data and areas identification label for each area.

35. An apparatus according to claim 31, wherein said designating means designates a plurality of areas of arbitrary shape.

36. An apparatus according to claim 31, wherein said designating means designates the plurality of rectangular areas on a display screen which displays the image data.

37. An apparatus according to claim 36, wherein said designating means designates the plurality of rectangular areas with a mouse.

38. An apparatus according to claim 31, wherein said first storage means image data memory stores the image data input with a scanner.

39. An apparatus according to claim 31, further comprising a display for displaying the recognition result.

40. An apparatus according to claim 39, wherein said display also displays the stored image data.

* * * * *

UNITED STATES PATENT AND TRADEMARK OFFICE
CERTIFICATE OF CORRECTION

PATENT NO. : 5,563,964

DATED : October 8, 1996

INVENTORS : Tetsuomi Tanaka, et al.

It is certified that error appears in the above-identified patent and that said Letters Patent is hereby corrected as shown below:

COLUMN 5

Line 11, "ID number" should read --ID number 42--;
Line 13, "block length" should read --block length 43--;
Line 14, "characters" should read --characters 44--;
Line 15, "pitch" should read --pitch 45--; and
Line 17, "character height" should read --character height 47--.

COLUMN 10

Line 14, "areas" should read --area--.

Signed and Sealed this

Fourth Day of March, 1997

Attest:

BRUCE LEHMAN

Attesting Officer

Commissioner of Patents and Trademarks